US012365594B2

(12) United States Patent
Liang et al.

(10) Patent No.: US 12,365,594 B2
(45) Date of Patent: Jul. 22, 2025

(54) SILICON-OXYGEN COMPOUND, METHOD FOR PREPARATION THEREOF, AND RELATED SECONDARY BATTERY, BATTERY MODULE, BATTERY PACK AND APPARATUS

(71) Applicant: CONTEMPORARY AMPEREX TECHNOLOGY (HONG KONG) LIMITED, Hong Kong (CN)

(72) Inventors: Chengdu Liang, Ningde (CN); Yingjie Guan, Ningde (CN); Yuzhen Zhao, Ningde (CN); Yan Wen, Ningde (CN); Qisen Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 588 days.

(21) Appl. No.: 17/584,304

(22) Filed: Jan. 25, 2022

(65) Prior Publication Data
US 2022/0144648 A1 May 12, 2022

Related U.S. Application Data

(63) Continuation of application No. PCT/CN2020/101840, filed on Jul. 14, 2020.

(30) Foreign Application Priority Data
Jul. 29, 2019 (CN) .......................... 201910688250.1

(51) Int. Cl.
C01B 33/113 (2006.01)
H01M 4/02 (2006.01)
(Continued)

(52) U.S. Cl.
CPC .......... *C01B 33/113* (2013.01); *H01M 4/366* (2013.01); *H01M 4/505* (2013.01);
(Continued)

(58) Field of Classification Search
CPC ..... C01B 33/113; H01M 4/366; H01M 4/505; H01M 10/0525; H01M 2004/021;
(Continued)

(56) References Cited

U.S. PATENT DOCUMENTS

2012/0115031 A1 5/2012 Atanassova et al.
2018/0151873 A1* 5/2018 Matsuno ............... H01M 4/483

FOREIGN PATENT DOCUMENTS

CN 100474667 4/2009
CN 103647056 A * 3/2014 .......... H01M 10/052
(Continued)

OTHER PUBLICATIONS

The First Office Action for Korean Application No. 10-2022-7003507, dated Sep. 13, 2024, 17 pages.
(Continued)

*Primary Examiner* — Daniel S Gatewood
(74) *Attorney, Agent, or Firm* — East IP P.C.

(57) ABSTRACT

The present application discloses a silicon-oxygen compound, a method for preparation thereof, and a secondary battery, a battery module, a battery pack and an apparatus related thereto. The silicon-oxygen compound includes both manganese element and a copper element, a content of the manganese element is from 20 ppm to 500 ppm, and a mass ratio of the manganese element to the copper element is from 1 to 18.

18 Claims, 3 Drawing Sheets

(51) Int. Cl.
*H01M 4/36* (2006.01)
*H01M 4/505* (2010.01)
*H01M 10/0525* (2010.01)

(52) U.S. Cl.
CPC ..... *H01M 10/0525* (2013.01); *C01P 2002/72* (2013.01); *C01P 2002/82* (2013.01); *C01P 2004/61* (2013.01); *C01P 2006/11* (2013.01); *C01P 2006/12* (2013.01); *H01M 2004/021* (2013.01); *H01M 2004/027* (2013.01)

(58) Field of Classification Search
CPC ............. H01M 2004/027; H01M 4/62; H01M 4/1391; H01M 4/485; H01M 4/362; H01M 10/052; C01P 2002/72; C01P 2002/82; C01P 2004/61; C01P 2006/11; C01P 2006/12; Y02E 60/10
See application file for complete search history.

(56) References Cited

FOREIGN PATENT DOCUMENTS

| | | | |
|---|---|---|---|
| CN | 103779547 A | | 5/2014 |
| CN | 103872303 | | 6/2014 |
| CN | 104022257 A | | 9/2014 |
| CN | 104979538 | | 10/2015 |
| CN | 105585017 A | | 5/2016 |
| CN | 103779547 | | 6/2017 |
| CN | 107123790 A | * | 9/2017 ........ H01M 10/0525 |
| CN | 107636868 A | | 1/2018 |
| CN | 108199031 A | | 6/2018 |
| JP | 2013008696 A | * | 1/2013 |
| JP | 2014086254 A | | 5/2014 |
| JP | 2015170542 A | | 9/2015 |
| JP | 2016225199 A | | 12/2016 |
| KR | 20140051783 A | | 5/2014 |
| KR | 20180014710 A | | 2/2018 |
| TW | 201733190 | | 9/2017 |

OTHER PUBLICATIONS

Notice of Reasons for Refusal for Japanese Application No. 2022-505288, dated Jan. 27, 2023, 8 pages.
The International search report for PCT Application No. PCT/CN2020/101840, dated Oct. 13, 2020, 16 pages.
The First Office Action for China Application No. 201910688250.1, dated Jun. 29, 2021, 11 pages.
Wei Jinyun. A Study of Estimating Impujrity Content of Chemical Reaction Diffusion By Thickness of Oxide Thin Film. Acta Energiae Solaris Sinica. Jul. 31, 1998. Vol. 19, No. 3, pp. 287-288, 3 pages.
The First Office Action for Indian Application No. 202217003545, dated Mar. 7, 2022, 5 pages.
The Extended European Search Report for EP Application No. 20848421.2, dated Apr. 4, 2022, 9 pages.
The Notice of Allowance for KR Application No. 10-2022-7003507, dated May 28, 2025, 5 pages.

* cited by examiner

SILICON-OXYGEN COMPOUND, METHOD FOR PREPARATION THEREOF, AND RELATED SECONDARY BATTERY, BATTERY MODULE, BATTERY PACK AND APPARATUS

CROSS-REFERENCE TO RELATED APPLICATION

This application is a continuation of International Application No. PCT/CN2020/101840, filed on Jul. 14, 2020, which claims priority to Chinese Patent Application No. 201910688250.1 entitled "Silicon-Oxygen Compound and Secondary Battery" and filed on Jul. 29, 2019, both of which are incorporated herein by reference in their entireties.

TECHNICAL FIELD

This application belongs to the technical field of energy storage apparatus, and specifically relates to a silicon-oxygen compound, a method for preparation thereof, and related secondary battery, battery module, battery pack and apparatus

BACKGROUND

With increasing attention to environmental protection issues, environment-friendly secondary batteries are gradually being applied to electric vehicles. Different from secondary batteries used in consumer electronics, power-type secondary batteries have higher requirements for energy density and cycle life. Compared with traditional carbon materials, silicon-based materials as negative electrode active materials have very high theoretical gram capacity, which is several times greater than that of graphite-based negative electrode active materials. Therefore, the industry expects to use the silicon-based materials to increase energy density of secondary batteries.

However, the silicon-based materials have poor cycle life, resulting in relatively low cycle performance of secondary batteries in practical applications. Based on this, a silicon-based material with high cycle life needs to be provided.

SUMMARY

The first aspect of the present application provides a silicon-oxygen compound having a formula $SiO_x$, in which $0 \leq x \leq 2$, wherein the silicon-oxygen compound includes both manganese element and copper element, a content of the manganese element is from 20 ppm to 500 ppm, and a mass ratio of the manganese element to the copper element is from 1 to 18.

It is surprisingly found that, the silicon-oxygen compound provided in the present application includes both manganese element and copper element, a content of the manganese element is from 20 ppm to 500 ppm, and a mass ratio of the manganese element to the copper element is from 1 to 18, which significantly improves the capacity and cycle life of the silicon-oxygen compound, so that initial coulombic efficiency and cycle performance of a secondary battery using the silicon-oxygen compound are greatly improved.

In any of the above embodiments, the content of the manganese element is from 70 ppm to 400 ppm, optionally from 70 ppm to 295 ppm. The content of the manganese element in the silicon-oxygen compound within said range can further improve the initial coulombic efficiency and cycle life of the silicon-oxygen compound, and ensure its relatively high gram capacity, which can further improve the initial coulombic efficiency, cycle performance and energy density of the secondary battery using the silicon-oxygen compound.

In any of the above embodiments, a content of the copper element is from 10 ppm to 100 ppm, optionally from 15 ppm to 75 ppm. The content of the copper element in the silicon-oxygen compound within said range can further improve the initial coulombic efficiency and cycle life of the silicon-oxygen compound, and therefore can further improve the initial coulombic efficiency and cycle performance of the secondary battery.

In any of the above embodiments, the mass ratio of the manganese element to the copper element may be from 3.9 to 16; optionally, the mass ratio of the manganese element to the copper element may be from 3.9 to 12.1. The mass ratio of the manganese element to the copper element within the above range can further improve the capacity and cycle life of the silicon-oxygen compound, so that the capacity performance and cycle performance of the secondary battery are further improved.

In any of the above embodiments, in X-ray diffraction analysis, the silicon-oxygen compound may have a diffraction peak at a position where a diffraction angle $2\theta$ is from $19°$ to $27°$, and the diffraction peak has a full width at half maxima of from $4°$ to $12°$; optionally, the diffraction peak has a full width at half maxima of from $5°$ to $10°$. The silicon-oxygen compound has a diffraction peak at the diffraction angle $2\theta$ of from $19°$ to $27°$, and the full width at half maxima of the diffraction peak is within the given range, which can further improve the cycle life of the secondary battery.

In any of the above embodiments, in Raman spectrum analysis, the silicon-oxygen compound may have scattering peaks at positions where Raman shifts are from $1300$ cm$^{-1}$ to $1400$ cm$^{-1}$ and from $1550$ cm$^{-1}$ to $1650$ cm$^{-1}$, respectively. The silicon-oxygen compound is beneficial for improving the capacity of the secondary battery and improving the cycle capacity retention rate of the secondary battery, which can improve the cycle performance of the secondary battery.

In any of the above embodiments, the silicon-oxygen compound has an average particle size $D_v50$ of from 4 μm to 15 μm; optionally, the $D_v50$ of the silicon-oxygen compound is from 5 μm to 10 μm. The $D_v50$ of the silicon-oxygen compound with an appropriate range enables the secondary battery to have both relatively high cycle performance and dynamics performance, and is also beneficial for increasing the energy density of the battery.

In any of the above embodiments, the silicon-oxygen compound has a specific surface area of from 0.5 m$^2$/g to 6 m$^2$/g; optionally, the silicon-oxygen compound has a specific surface area of from 1 m$^2$/g to 3 m$^2$/g. The specific surface area of the silicon-oxygen compound within an appropriate range can further improve the cycle performance and dynamics performance of the secondary battery.

In any of the above embodiments, the silicon-oxygen compound has a compaction density of from 1.2 g/cm$^3$ to 1.7 g/cm$^3$ measured under a pressure of 5 tons (equivalent to 49 KN); optionally, the silicon-oxygen compound has a compaction density of from 1.2 g/cm$^3$ to 1.5 g/cm$^3$ measured under a pressure of 5 tons (equivalent to 49 KN). The compaction density of the silicon-oxygen compound within the above range enables the secondary battery to obtain a relatively high energy density.

In any of the above embodiments, the silicon-oxygen compound has a coating layer on an outer surface, and the coating layer includes one or more of a polymer, a carbon material, a metal material, and a metal compound. The silicon-oxygen compound having a coating layer on the surface can further improve the cycle performance of the secondary battery.

The second aspect of the present application provides a method for preparing a silicon-oxygen compound, including the following steps:

providing raw materials including a copper source, optionally a manganese source, and at least one of silicon monoxide powder and a mixture of elemental silicon powder and silicon dioxide powder; and heating the raw materials in an inert atmosphere under normal pressure or reduced pressure to generate gas;

cooling the gas in the inert atmosphere under normal pressure or reduced pressure to deposit and thus obtain the silicon-oxygen compound from the gas;

wherein the silicon-oxygen compound has a formula $SiO_x$, $0 \leq x \leq 2$, the silicon-oxygen compound contains both manganese element and copper element, a content of the manganese element is from 20 ppm to 500 ppm, and a mass ratio of the manganese element to the copper element is from 1 to 18.

The silicon-oxygen compound obtained by the method provided in this application contains both manganese element and copper element, a content of the manganese element is from 20 ppm to 500 ppm, and a mass ratio of the manganese element to the copper element is from 1 to 18, which significantly improves capacity and cycle life of the silicon-oxygen compound, so that initial coulombic efficiency and cycle performance of a secondary battery using the silicon-oxygen compound are greatly improved.

In any of the above embodiments, the deposition temperature is 850° C. or below; optionally, the deposition temperature is from 300° C. to 750° C. The proper deposition temperature is beneficial for improving the crystal structure of the silicon-oxygen compound, so that the obtained silicon-oxygen compound has a diffraction peak at a diffraction angle 2θ of from 19° to 27°, and the diffraction peak has a full width at half maxima of from 4° to 12°, or from 5° to 10°, which can improve the corresponding performance of the battery.

In any of the above embodiments, after the gas deposition, the method further includes a step of crushing the obtained deposit. By crushing, the silicon oxide can obtain required particle size distribution and specific surface area, thereby improving the corresponding performance of the battery.

In any of the above embodiments, after the obtained deposit is crushed, the method further includes a step of surface coating the particles. A coating layer is formed on the outer surface of the obtained silicon-oxygen compound through the coating step, which can further improve the cycle performance of the secondary battery.

The third aspect of the present application provides a secondary battery, including the silicon-oxygen compound according to the first aspect of the present application or the silicon-oxygen compound obtained according to the method of the second aspect of the present application.

The secondary battery of the present application adopts the silicon-oxygen compound of the present application, and therefore can have relatively high initial coulombic efficiency and cycle performance.

The fourth aspect of the present application provides a battery module, including the secondary battery according to the third aspect of the present application.

The fifth aspect of the present application provides a battery pack, including the battery module according to the fourth aspect of the present application.

The sixth aspect of the present application provides an apparatus, including at least one of the secondary battery according to the third aspect of the present application, the battery module according to the fourth aspect of the present application, or the battery pack according to the fifth aspect of the present application.

The battery module, the battery pack, and the apparatus of the present application include the secondary battery described in the present application, and therefore have at least the same or similar technical effects as the secondary battery.

DESCRIPTION OF THE DRAWINGS

In order to explain the technical solutions of the embodiments of the present application more clearly, the following will briefly introduce the drawings that need to be used in the embodiments of the present application. A person of ordinary skill in the art can obtain other drawings based on the drawings without creative work.

DETAILED DESCRIPTION

Figure 1:
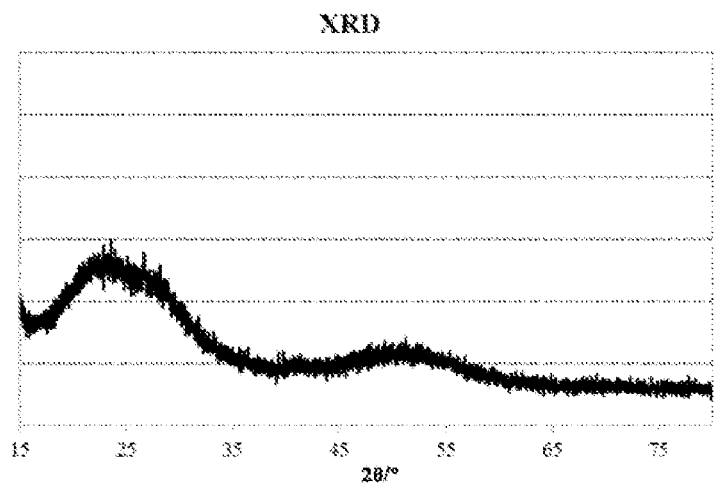
FIG. 1 is an X-ray diffraction (XRD) pattern of a silicon-oxygen compound according to an embodiment of the present application.

In order to make the objectives, technical solutions and beneficial technical effects of the present application clearer, the present application will be described in detail below in conjunction with specific embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range "no less than" and "no more than" include all numbers within that range including the endpoints, and the recitation of "more" in the phrase "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Silicon-Oxygen Compound

The first aspect of the present application provides a silicon-oxygen compound. The silicon-oxygen compound has a formula $SiO_x$, in which $0 \leq x \leq 2$, wherein the silicon-oxygen compound contains both manganese element and copper element, wherein a content of the manganese element is from 20 ppm to 500 ppm, and a mass ratio of the manganese element to the copper element is from 1 to 18.

Herein, ppm (parts per million) refers to a mass of the manganese element or copper element in the silicon-oxygen compound in parts per million of a mass of the silicon-oxygen compound.

The silicon-oxygen compound of the present application contains both manganese element and copper element, a content of the manganese element is from 20 ppm to 500 ppm, and a mass ratio of the manganese element to the copper element is from 1 to 18. Although the principle cannot be well explained yet, it can be inferred from research that the specific content of manganese and copper elements improves the conductivity of active ions and electrons during intercalation/deintercalation of active ions in the silicon-oxygen compound, and can also reduce polarization of a negative electrode and can suppress the increase in impedance of the negative electrode during a cycle, which is beneficial for improving the capacity of the silicon-oxygen compound and capacity retention rate during the cycle, thereby greatly improving the initial coulombic efficiency and cycle performance of a secondary battery.

herefore, the silicon-oxygen compound of the present application enables the secondary battery to have relatively high cycle performance, initial coulombic efficiency and energy density.

Optionally, in the silicon-oxygen compound $SiO_x$, $0.6 \leq x \leq 1.5$. Further optionally, $0.9 \leq x \leq 1.2$.

The silicon-oxygen compound satisfies that x is 2 or less, for example 1.5 or less, or 1.2 or less, which enables the silicon-oxygen compound to have relatively high capacity performance and relatively high coulombic efficiency. The silicon-oxygen compound satisfies that x is greater than 0, for example 0.6 or more, or 0.9 or more, which can better reduce volume expansion effect of the silicon-oxygen compound and ensure that the silicon-oxygen compound has high capacity and long cycle life.

In the silicon-oxygen compound of the present application, the content of the manganese element may be $\leq 500$ ppm, $\leq 480$ ppm, $\leq 450$ ppm, $\leq 420$ ppm, $\leq 400$ ppm, $\leq 370$ ppm, $\leq 350$ ppm, $\leq 330$ ppm, $\leq 300$ ppm, $\leq 280$ ppm, $\leq 250$ ppm, $\leq 230$ ppm, or $\leq 200$ ppm. In the silicon-oxygen compound of the present application, the content of the manganese element may be $\geq 20$ ppm, $\geq 50$ ppm, $\geq 70$ ppm, $\geq 100$ ppm, $\geq 120$ ppm, $\geq 150$ ppm, or $\geq 180$ ppm. Optionally, the content of the manganese element is from 70 ppm to 400 ppm, for example, from 70 ppm to 295 ppm, from 70 ppm to 200 ppm, etc.

The content of the manganese element is 500 ppm or less, for example, 400 ppm or less, which is beneficial for ensuring that the silicon-oxygen compound has high gram capacity and initial coulombic efficiency. The content of the manganese element is 20 ppm or more, for example, 70 ppm or more, which is beneficial for improving the transport performance of ions and electrons in the silicon-oxygen compound, so that the silicon-oxygen compound has high initial coulombic efficiency and long cycle life.

In the silicon-oxygen compound of the present application, optionally, a content of the copper element is from 10 ppm to 100 ppm. For example, the content of the copper element may be $\leq 100$ ppm, $\leq 95$ ppm, $\leq 90$ ppm, $\leq 85$ ppm, $\leq 80$ ppm, $\leq 75$ ppm, $\leq 70$ ppm, $\leq 65$ ppm, $\leq 60$ ppm, $\leq 55$ ppm, or $\leq 50$ ppm. For example, the content of the copper element may be $\geq 10$ ppm, $\geq 12$ ppm, $\geq 15$ ppm, $\geq 20$ ppm, $\geq 25$ ppm, $\geq 30$ ppm, $\geq 35$ ppm, $\geq 40$ ppm, or $\geq 45$ ppm. Further optionally, the content of the copper element is from 15 ppm to 75 ppm.

The content of the copper element is optionally 100 ppm or less, and further optionally 75 ppm or less, which helps to ensure that the silicon-oxygen compound has a high gram capacity. The content of the copper element is optionally 10 ppm or more, and further optionally 15 ppm or more, which is beneficial for enabling a negative electrode active material to have a long cycle life.

In the silicon-oxygen compound of the present application, optionally, the mass ratio of the manganese element to the copper element may be from 2 to 18, 3.9 to 16, 3.9 to 14.7, 3.9 to 12.1, 3.9 to 10.0, or 4 to 10.

The mass ratio of the manganese element to the copper element within the above range can further improve the capacity and cycle life of the silicon-oxygen compound, so that the capacity performance and cycle performance of the secondary battery are further improved. Although the principle cannot be well explained, it can be inferred according to research that, the mass ratio of the manganese element to the copper element in the silicon-oxygen compound within the above range can better exert the synergistic effect of the manganese element and the copper element, thereby further improving the capacity performance and cycle life of the silicon-oxygen compound.

In some embodiments, optionally, referring to an X-ray diffraction pattern of the silicon-oxygen compound according to the present application shown in FIG. 1, it has a diffraction peak at a position where a diffraction angle $2\theta$ is from 19° to 27°, and the diffraction peak has a full width at half maxima of from 4° to 12°. Here, the full width at half maxima (FWHM) refers to a width of the peak at half the height of the peak.

The silicon-oxygen compound has a diffraction peak at the diffraction angle $2\theta$ of from 19° to 27°, and the diffraction peak has a full width at half maxima of from 4° to 12°, which enables the silicon-oxygen compound to have relatively high gram capacity and relatively low cycle expansion and not easy to break and pulverize during the charge and discharge cycle of the secondary battery. Thus the cycle life of the battery can be further improved.

Optionally, in X-ray diffraction analysis of the silicon-oxygen compound, the diffraction peak at the diffraction angle $2\theta$ of from 19° to 27° has a full width at half maxima of from 5° to 10°. The silicon-oxygen compound can have higher structural stability.

In some embodiments, optionally, the silicon-oxygen compound has a coating layer on an outer surface, and the coating layer may comprise one or more of a polymer, a carbon material, a metal material and a metal compound, for example, the coating layer comprises one or more of a polymer coating layer, a carbon coating layer and a metal compound coating layer.

Optionally, the polymer may be one or more selected from of polyaniline, polyacetylene, polystyrene, polyacrylonitrile, polyvinyl chloride and polyethylene.

Optionally, the carbon material may comprise one or more of graphite, mesocarbon microbeads (MCMB), carbon from hydrocarbon pyrolysis, hard carbon and soft carbon, wherein the graphite may be one or more of natural graphite and artificial graphite.

Optionally, the metal compound may comprise one or more of $Ti_5Si_3$, $Al_2O_3$, $ZrO_2$, and $TiO_2$.

The coating layer can further alleviate the volume expansion effect of the silicon-oxygen compound and improve the cycle life of the material. In addition, the coating layer also protects the silicon-oxygen compound, inhibits side reaction of an electrolyte on the surface of the material, and protects the surface of the material from being corroded by the electrolyte, so as to ensure that the silicon-oxygen compound has relatively high capacity and thus the cycle life of the battery is further improved.

Figure 2:
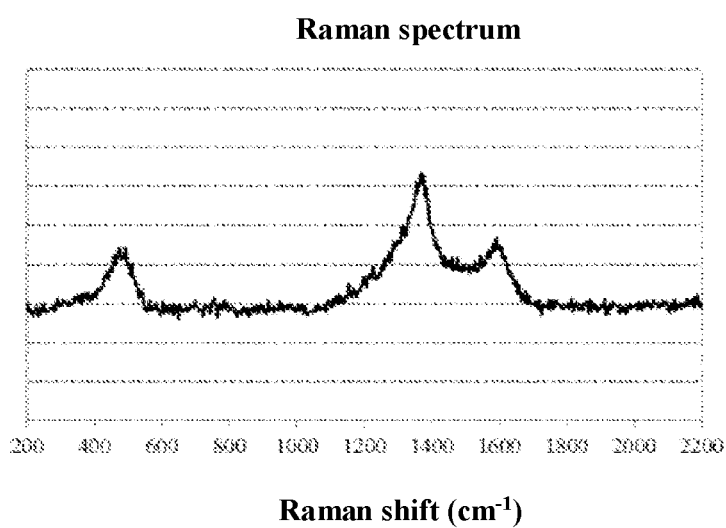
FIG. 2 is a Raman spectrogram of a silicon-oxygen compound according to another embodiment of the present application.

In some embodiments, optionally, referring to a Raman spectrogram of the silicon-oxygen compound according to the present application shown in FIG. 2, in Raman spectrum analysis, the silicon-oxygen compound of the present application has scattering peaks at positions where Raman shifts are from 1300 $cm^{-1}$ to 1400 $cm^{-1}$ and from 1550 $cm^{-1}$ to 1650 $cm^{-1}$, respectively. This is conducive to maintaining a good conductive network in a negative electrode plate, improving the capacity of the secondary battery and improving capacity retention rate of the secondary battery during the cycle, and can effectively alleviate volume expansion of the silicon-oxygen compound and improve cycle performance of the secondary battery.

In some embodiments, optionally, the silicon-oxygen compound has an average particle size $D_v50$ satisfying 4 $\mu m \leq D_v50 \leq 15$ $\mu m$. For example, 5 $\mu m \leq D_v50 \leq 10$ $\mu m$.

The $D_v50$ of the silicon-oxygen compound is optionally 4 $\mu m$ or more, for example, 5 $\mu m$ or more, which can reduce film-forming consumption of active ions on the negative electrode, and reduce side reaction of the electrolyte on the negative electrode, thereby reducing irreversible capacity of the secondary battery and improving the cycle performance of the secondary battery. In addition, the $D_v50$ of the silicon-oxygen compound is optionally 4 $\mu m$ or more, for example, 5 $\mu m$ or more, which is also conducive to reducing the addition of a binder in the negative electrode plate, thereby further increasing the energy density of the secondary battery.

The $D_v50$ of the silicon-oxygen compound may be 15 $\mu m$ or less, for example, 10 $\mu m$ or less, which enables relatively short migration paths of active ions and electrons in material particles, and increases the migration rate of active ions and electrons, thereby improving the dynamics performance of the secondary battery; and such $D_v50$ is also beneficial for preventing the silicon-oxygen compound from breaking or cracking during charging and discharging, thereby improving the cycle performance of the secondary battery.

In some embodiments, optionally, the silicon-oxygen compound has a specific surface area of from 0.5 $m^2/g$ to 6 $m^2/g$, for example, from 1 $m^2/g$ to 3 $m^2/g$.

When the specific surface area of the silicon-oxygen compound is optionally 0.5 $m^2/g$ or more, for example, 1 $m^2/g$ or more, surfaces of material particles have more active sites, which can improve electrochemical performance of the silicon-oxygen compound and meet the requirements of the secondary battery for dynamics performance. The specific surface area of the silicon-oxygen compound is optionally 6 $m^2/g$ or less, for example, 3 $m^2/g$ or less, which is beneficial for reducing side reaction of the electrolyte on the negative electrode, and can also reduce film-forming consumption of active ions on the negative electrode, thereby reducing irreversible capacity of the secondary battery and improving cycle performance of the secondary battery.

In some embodiments, optionally, the silicon-oxygen compound has a compaction density of from 1.2 $g/cm^3$ to 1.7 $g/cm^3$, for example, from 1.2 $g/cm^3$ to 1.5 $g/cm^3$, measured under a pressure of 5 tons (equivalent to 49 KN). The compaction density of the silicon-oxygen compound within the above range enables the battery to obtain a relatively high energy density.

In the present application, the contents of the manganese element and the copper element in the silicon-oxygen compound of the present application can be measured by instruments and methods known in the art. For example, the silicon-oxygen compound is digested with reference to EPA-3052-1996 ("Microwave Assisted Acid Digestion of Silicates"), and then the contents of the manganese element and the copper element are measured according to EPA 6010D-2014 ("Inductively Coupled Plasma Atomic Emission Spectrometry by using ICAP-7000 inductively coupled plasma emission spectrometer (ICP-OES) from Thermo Fisher Scientific, USA. The specific test method is as follows: microwave digestion is performed on 0.5 g of silicon-oxygen compound sample by using 10 mL of nitric acid and 10 mL of hydrofluoric acid, the digested sample is added to a 50 mL volumetric flask to a constant volume, and then the contents of the manganese element and the copper element are measured by using the ICAP-7000 ICP-OES.

In this application, the X-ray diffraction spectrum of the silicon-oxygen compound of this application can be measured by instruments and methods known in the art. For example, the X-ray diffraction spectrum is measured by using an X-ray powder diffractometer according to JIS K0131-1996 ("General rules for X-ray diffraction analysis"). For another example, an X-ray diffractometer (Bruker D8 Discover) from Bruker AxS, Germany is used, with $CuK_\alpha$ rays as a radiation source, a ray wavelength $\lambda=1.5406$ Å, a scanning $2\theta$ angle range from 10° to 90°, and a scanning rate of 4°/min.

In this application, the Raman spectrogram of the silicon-oxygen compound of this application can be measured by instruments and methods known in the art. For example, 3 points are randomly selected from the silicon-oxygen compound powder of this application for testing by using a Raman spectrometer to obtain three groups of measured values, which are then averaged. The Raman spectrometer may be a LabRAM HR Evolution laser micro-Raman spectrometer, which uses a solid-state laser with a wavelength of 523 nm as a light source, a beam diameter of 1.2 $\mu m$, and a power of 1 mW; the measurement mode adopts macro-Raman; and a CCD detector is used.

In this application, the average particle size $D_v50$ of the silicon-oxygen compound has a meaning known in the art, and can be measured by instruments and methods known in the art. For example, the $D_v50$ can be conveniently measured with reference to the GB/T 19077-2016 ("Particle Size Distribution Laser Diffraction Methods") by using a laser particle size analyzer, such as Mastersizer 2000E laser particle size analyzer from Malvern Instruments Co., Ltd., UK. The $D_v50$ represents a particle size when the cumulative volume distribution percentage of the silicon-oxygen compound reaches 50%.

In this application, the specific surface area of the silicon-oxygen compound has a meaning known in the art, and can be measured by instruments and methods known in the art.

For example, the specific surface area can be tested by a nitrogen adsorption specific surface area analysis test method with reference to the standards of GB/T 19587-2017 ("Determination of the specific surface area of solids by gas adsorption using the BET method"), and calculated by a BET (Brunauer Emmett Teller) method, wherein the nitrogen adsorption specific surface area analysis test can be carried out by a specific surface and porosity analyzer (TriStarII 3020) from Micromeritics, USA.

In this application, the compaction density of the silicon-oxygen compound can be measured by instruments and methods known in the art, for example, with reference to the GB/T24533-2009 standards, by an electronic pressure tester, such as UTM7305 electronic pressure tester. About 1 g of sample is accurately weighed and added into a mold with a bottom area of 1.327 cm$^2$, a pressure of 5 tons (equivalent to 49 KN) is applied to the sample by using a pressure device, kept for 30 seconds and then relieved, the height of the sample is measured subsequently, and the compaction density of the material can be obtained through a formula $\rho=m/(1.327\times h)$. In the formula, $\rho$ represents the compaction density of the material, m represents the mass of the sample, and h represents the height of the sample after being applied with a pressure of 5 tons (equivalent to 49 KN) and held at this pressure for 30 seconds before releasing the pressure.

The present application further provides a method for preparing the silicon-oxygen compound, including the following steps:

S10, providing raw materials and heating the raw materials in an inert atmosphere under normal pressure or reduced pressure to generate a gas;

S20, cooling the gas in an inert atmosphere under normal pressure or reduced pressure to deposit and obtain from the gas the silicon-oxygen compound according to the first aspect of the present application.

Optionally, the raw materials include a copper source, optionally a manganese source, and at least one of silicon monoxide powder and a mixture of elemental silicon powder and silicon dioxide powder.

The manganese element may be derived from metallic silicon powder and/or silicon monoxide powder, and may also be derived from a manganese source.

The Contents of the manganese element and the copper element in the silicon-oxygen compound of the present application can be controlled by g one or more of the following means: by selecting the silicon monoxide powder or silicon powder and silicon dioxide powder with different manganese content, and by adjusting the adding amount of a manganese source and/or a copper source, so that a content of the manganese element is from 20 ppm to 500 ppm, and a mass ratio of the manganese element to the copper element is from 1 to 18.

Optionally, the manganese source may be selected from metallic manganese, a manganese alloy, or a manganese compound. The manganese compound may be one or more selected from of manganese oxide, manganese carbonate, manganese hydroxide, manganese acetate, manganese oxalate, manganese nitrate, and manganese sulfate.

Optionally, the copper source may be selected from metallic copper, a copper alloy, or a copper compound. The copper compound may be one or more selected from of copper oxide, copper carbonate, copper hydroxide, copper acetate, copper oxalate, copper nitrate, and copper sulfate.

In the above method, in step S10, the inert atmosphere may be a nitrogen atmosphere, an argon atmosphere, a nitrogen atmosphere, etc. The pressure of the inert atmosphere is normal pressure or reduced pressure. Optionally, the absolute pressure of the inert atmosphere is from 10 Pa to 1 kPa, for example, from 20 Pa to 50 Pa. The heating temperature is optionally from 1100° C. to 1600° C.

Within the above heating temperature range, the higher the temperature, the more beneficial the gasification of the copper source and the manganese source. When the raw materials contain certain manganese source and copper source, the temperature rise can increase the contents of the manganese element and the copper element in the silicon-oxygen compound finally obtained.

Within the above pressure range of the inert atmosphere, the lower the pressure is, the more beneficial the gasification of the copper source and the manganese source is. When the raw materials contain certain manganese source and copper source, reducing the pressure, i.e., increasing the vacuum, can increase the contents of the manganese element and the copper element in the silicon-oxygen compound finally obtained.

In the above method, in step S20, the inert atmosphere may be a nitrogen atmosphere, an argon atmosphere, a nitrogen atmosphere, etc. The pressure of the inert atmosphere is normal pressure or reduced pressure. Optionally, the absolute pressure of the inert atmosphere is from 10 Pa to 1 kPa, for example, from 20 Pa to 50 Pa.

In the above method, in step S20, the deposition temperature can be adjusted such that the silicon-oxygen compound of the present application has a diffraction peak at a position where a diffraction angle 2θ is from 19° to 27°, and the diffraction peak has a full width at half maxima of from 4° to 12°, or from 5° to 10°. Optionally, the deposition temperature is 850° C. or less, for example, from 300° C. to 750° C.

Further, after step S20, step S30 may be further included, in which the obtained deposit is crushed, thus obtaining the silicon-oxygen compound having the above particle size distribution and specific surface area.

In step S30, the deposit may be crushed by any method and device known in the art, such as a grinder.

Further, after step S30, step S40 may be further optionally included, in which surfaces of particles obtained in step S30 are coated.

In step S40, the surfaces of the particles are coated using a chemical vapor deposition method to form a coating layer. For example, a hydrocarbon compound gas is introduced into a reactor loaded with the particles, and heat treatment is performed in an inert atmosphere to carbonize the hydrocarbon compound, thus forming the coating layer covering the surfaces of the particles.

Alternatively, the surfaces of the particles may be coated using a liquid phase coating method to form a coating layer. For example, a polymer is dissolved in a certain solvent and fully stirred with the silicon-oxygen compound particles for uniform mixing, then the solvent is removed by evaporation, and the polymer uniformly coats the surfaces of the silicon-oxygen compound particles.

Secondary Battery

The second aspect of the present application provides a secondary battery, including the silicon-oxygen compound according to the first aspect of the present application.

Specifically, the secondary battery comprises a positive electrode plate, a negative electrode plate, a separator, and an electrolyte. The negative electrode plate comprises a negative electrode current collector and a negative electrode film disposed on at least one surface of the negative electrode current collector, and comprising a negative electrode active material. The negative electrode active material comprises the silicon-oxygen compound according to the first aspect of the present application.

In the secondary battery of the present application, the negative electrode current collector may be made of a material with good electrical conductivity and mechanical strength, such as a copper foil.

In the secondary battery of the present application, the negative electrode active material may further optionally comprise one or more of graphite, hard carbon and soft carbon. Optionally, the negative electrode active material further comprises graphite. The graphite may be one or more selected from of artificial graphite and natural graphite.

In the secondary battery of the present application, the negative electrode film may further optionally comprise a conductive agent, a binder and a thickener, their types are not specifically limited, and a person skilled in the art can select them according to actual requirements.

Optionally, the conductive agent used for the negative electrode film may be one or more selected from of graphite, superconducting carbon, acetylene black, carbon black, Ketjen black, carbon dots, carbon nanotubes, graphene and carbon nanofibers; the binder may be one or more selected from of polyacrylic acid (PAA), sodium polyacrylate (PAAS), polyvinyl alcohol (PVA), styrene butadiene rubber (SBR), sodium carboxymethyl cellulose (CMC-Na), sodium alginate (SA), polymethacrylic acid (PMAA) and carboxymethyl chitosan (CMCS); the thickener may be selected from sodium carboxymethyl cellulose (CMC-Na).

The negative electrode plate can be prepared according to conventional method in the art. For example, the silicon-oxygen compound and other optional negative electrode active material, conductive agent, binder and thickener are dispersed in a solvent which may be deionized water to form a uniform negative electrode slurry; the negative electrode slurry is coated on a negative electrode current collector, and after being dried, cold pressed and other steps the negative electrode plate is obtained.

In the secondary battery of the present application, the positive electrode plate may comprise a positive electrode current collector and a positive electrode film disposed on at least one surface of the positive electrode current collector and comprising a positive electrode active material.

In the secondary battery of the present application, the positive electrode current collector may be made of a material with good electrical conductivity and mechanical strength, such as an aluminum foil.

In the secondary battery of the present application, the specific type of the positive electrode active material is not specifically limited, materials capable of reversibly deintercalating/intercalating active ions can be used, and a person skilled in the art can select the material according to actual requirements. Optionally, the positive electrode active material may be selected from a lithium transition metal oxide and a modified material thereof, and the modified material may be lithium transition metal oxide subjected to coating modification and/or doping modification. Optionally, the lithium transition metal oxide may be one or more selected from of lithium cobalt oxide, lithium nickel oxide, lithium manganese oxide, lithium nickel manganese oxide, lithium nickel cobalt manganese oxide, and lithium nickel cobalt aluminum oxide.

In the secondary battery of the present application, the positive electrode film may further comprise a binder and/or a conductive agent. The types of the binder and the conductive agent are not specifically limited, and a person skilled in the art can select them according to actual requirements. Optionally, the binder used for the positive electrode film may be one or more of polyvinylidene fluoride (PVDF) and polytetrafluoroethylene (PTFE); the conductive agent may be one or more of graphite, superconducting carbon, acetylene black, carbon black, Ketjen black, carbon dots, carbon nanotubes, graphene, and carbon nanofibers.

The positive electrode plate can be prepared according to conventional methods in the art. For example, the positive electrode active material and optional conductive agent and binder are dispersed in a solvent (such as N-methylpyrrolidone (NMP)) to form a uniform positive electrode slurry; the positive electrode slurry is coated on a positive electrode current collector, and after being dried, cold pressed and other steps the positive electrode plate is obtained.

In the secondary battery of the present application, the type of electrolyte is not specifically limited, and the electrolyte may be selected according to requirements. The electrolyte may be selected from at least one of solid electrolytes and liquid electrolytes (i.e., electrolytic solution). When the electrolyte is an electrolytic solution, the electrolytic solution comprises an electrolyte salt and a solvent.

Optionally, the electrolyte salt may be one or more selected from of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfimide), LiTFSI (lithium bistrifluoromethanesulfonimide), LiTFS (lithium trifluoromethanesulfonate), LiDFOB (lithium difluorooxalate borate), LiBOB (lithium bisoxalate borate), $LiPO_2F_2$ (lithium difluorophosphate), LiDFOP (lithium difluorobisoxalate phosphate), and LiTFOP (lithium tetrafluorooxalate phosphate).

Optionally, the solvent may be one or more selected from of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

The electrolytic solution may further optionally comprise additives. The type of additives is not specifically limited, and may be selected according to requirements. For example, the additives may comprise negative electrode film-forming additives, positive electrode film-forming additives, and additives that can improve certain performances of the battery, such as additives that improve overcharge performance of the battery, additives that improve high-temperature performance of the battery, and additives that improve low-temperature performance of the battery.

In the secondary battery of the present application, the separator serves to isolate the positive electrode plate and the negative electrode plate. The type of separator is not specially limited, and the separator may be any known porous separator with good chemical and mechanical stability, such as one or more of glass fiber, non-woven fabric, polyethylene, polypropylene and polyvinylidene fluoride. The separator may be a single-layer film or a multi-layer composite film. When the separator is a multi-layer composite film, materials of respective layers may be the same or different.

The secondary battery may be prepared by a method known in the art. As an example, the positive electrode plate, the separator, and the negative electrode plate are wound (or stacked) in order with the separator between the positive electrode plate and the negative electrode plate for separation to obtain a battery core, and the battery core is placed in an outer package, injected with electrolyte and sealed to obtain the secondary battery.

Figure 3:
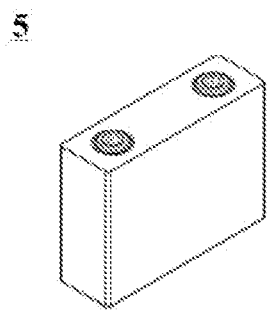
FIG. 3 is a schematic diagram of an embodiment of a secondary battery.

The present application does not have particular limitation to the shape of the secondary battery. The secondary battery may be cylindrical, square, or in other arbitrary shape. FIG. 3 shows a secondary battery 5 with a square structure as an example.

In some embodiments, the secondary battery may comprise an outer package. The outer package is used for packaging the positive electrode plate, the negative electrode plate, and the electrolyte.

Figure 4:
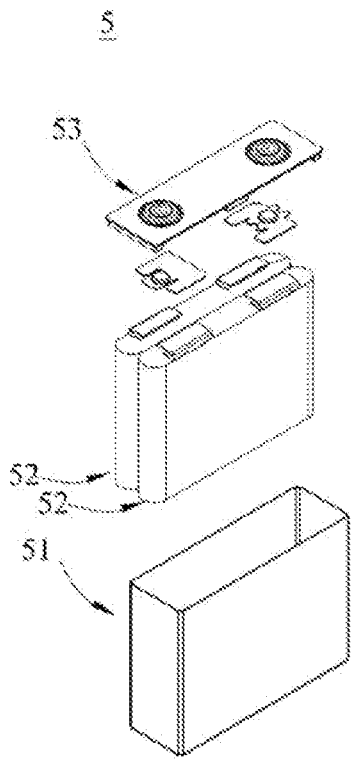
FIG. 4 is an exploded view of FIG. 3.

In some embodiments, referring to FIG. 4, the outer package may comprise a casing 51 and a cover plate 53. The casing 51 may comprise a bottom plate and side plates connected to the bottom plate, and the bottom plate and the side plates enclose a receiving cavity. The casing 51 has an opening communicated with the receiving cavity, and the cover plate 53 can cover the opening to close the receiving cavity.

The positive electrode plate, the negative electrode plate and the separator may be wound or laminated to form an electrode assembly 52. The electrode assembly 52 is packaged in the receiving cavity. The electrolyte which can be an electrolytic solution is infiltrated in the electrode assembly 52. The number of electrode assemblies 52 contained in the battery 5 can be one or more, which can be adjusted according to requirements.

In some embodiments, the outer package of the secondary battery may be a hard case, such as a hard plastic case, an aluminum case, or a steel case. The outer package of the secondary battery may also be a soft bag, such as a pounch type soft bag. The material of the soft bag may be plastic, for example, it may comprise one or more of polypropylene (PP), polybutylene terephthalate (PBT), polybutylene succinate (PBS), etc.

In some embodiments, the secondary batteries may be assembled into a battery module. The number of secondary batteries contained in the battery module can be multiple, and the specific number can be adjusted according to the application and capacity of the battery module.

Figure 5:
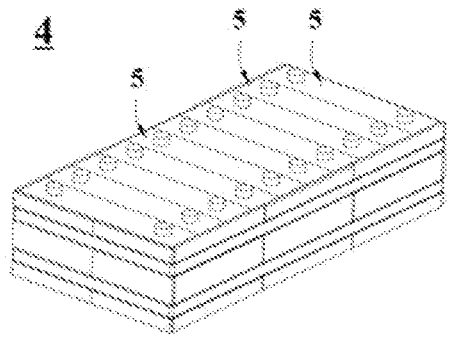
FIG. 5 is a schematic diagram of an embodiment of a battery module.

FIG. 5 shows a battery module 4 as an example. Referring to FIG. 5, in the battery module 4, a plurality of secondary batteries 5 may be arranged sequentially along the length direction of the battery module 4. Apparently, they may also be arranged in any other way. Further, the plurality of secondary batteries 5 may be fixed by fasteners.

Optionally, the battery module 4 may further comprise a housing having a receiving space, and the plurality of secondary batteries 5 are received in the receiving space.

In some embodiments, the above-mentioned battery module may also be assembled into a battery pack, and the number of battery modules included in the battery pack can be adjusted according to the application and capacity of the battery pack.

Figure 6:
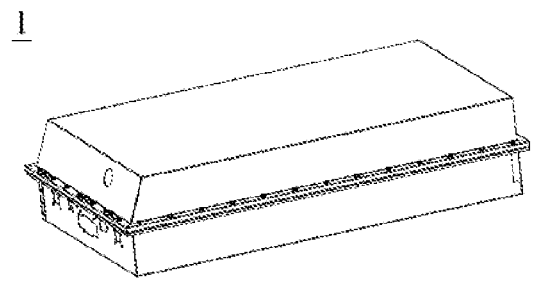
FIG. 6 is a schematic diagram of an embodiment of a battery pack.
Figure 7:
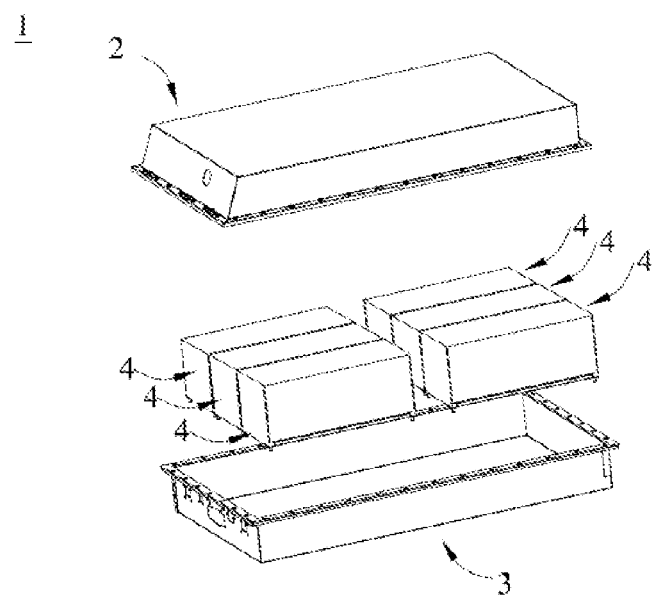
FIG. 7 is an exploded view of FIG. 6.

FIGS. 6 and 7 show a battery pack 1 as an example. Referring to FIGS. 6 and 7, the battery pack 1 may comprise a battery case and a plurality of battery modules 4 disposed in the battery case. The battery case comprises an upper case body 2 and a lower case body 3. The upper case body 2 may cover the lower case body 3 to form a closed space for receiving the battery modules 4. A plurality of battery modules 4 may be arranged in the battery case in any manner.

Apparatus

The present application further provides an apparatus comprising at least one of the secondary battery, the battery module, or the battery pack described in the present application. The secondary battery, the battery module, or the battery pack may be used as a power source of the apparatus, and may also be used as an energy storage unit of the apparatus. The apparatus may be, but is not limited to, a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus may comprise the secondary battery, the battery module, or the battery pack according to its usage requirements.

Figure 8:
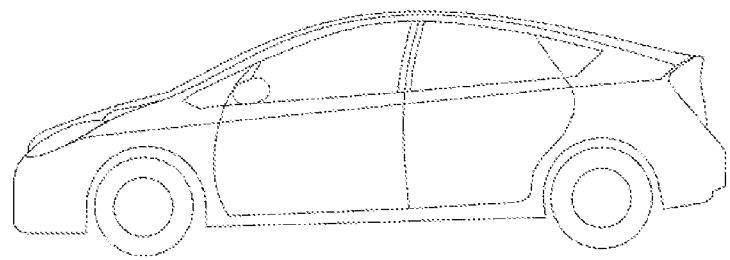
FIG. 8 is a schematic diagram of an embodiment of an apparatus using the secondary battery as a power source.

FIG. 8 shows an apparatus as an example. The apparatus is a pure electric vehicle, a hybrid electric vehicle, or a plug-in hybrid electric vehicle. In order to meet the requirements of the apparatus for high power and high energy density of secondary batteries, the battery pack or the battery module may be used.

As another example, the apparatus may be a mobile phone, a tablet computer, a notebook computer, etc. The apparatus is generally required to be thin and light, and the secondary battery can be used as a power source.

Exemplary Embodiments

Embodiment 1. A silicon-oxygen compound, the silicon-oxygen compound having a formula $SiO_x$, in which $0<x<2$, wherein the silicon-oxygen compound contains both manganese element and copper element, a content of the manganese element is from 20 ppm to 500 ppm, and a mass ratio of the manganese element to the copper element is from 1 to 18.

Embodiment 2. The silicon-oxygen compound according to embodiment 1, wherein the content of the manganese element is from 70 ppm to 400 ppm, optionally from 70 ppm to 295 ppm.

Embodiment 3. The silicon-oxygen compound according to embodiment 1 or 2, wherein a content of the copper element is from 10 ppm to 100 ppm, optionally from 15 ppm to 75 ppm.

Embodiment 4. The silicon-oxygen compound according to any one of embodiments 1 to 3, wherein the mass ratio of the manganese element to the copper element is from 3.9 to 16; optionally, the mass ratio of the manganese element to the copper element is from 3.9 to 12.1.

Embodiment 5. The silicon-oxygen compound according to any one of embodiments 1 to 4, wherein in X-ray diffraction analysis, the silicon-oxygen compound has a diffraction peak at a position where a diffraction angle 2θ is from 19° to 27°, and the diffraction peak has a full width at half maxima of from 4° to 12°; optionally, the diffraction peak has a full width at half maxima of from 5° to 10°.

Embodiment 6. The silicon-oxygen compound according to any one of embodiments 1 to 5, wherein in Raman spectrum analysis, the silicon-oxygen compound has scattering peaks at positions where Raman shifts are from 1300 $cm^{-1}$ to 1400 $cm^{-1}$ and from 1550 $cm^{-1}$ to 1650 $cm^{-1}$, respectively.

Embodiment 7. The silicon-oxygen compound according to any one of embodiments 1 to 6, wherein the silicon-oxygen compound has an average particle size $D_v50$ of from 4 μm to 15 μm; optionally, the silicon-oxygen compound has an average particle size $D_v50$ of from 5 μm to 10 μm.

Embodiment 8. The silicon-oxygen compound according to any one of embodiments 1 to 7, wherein the silicon-oxygen compound has a specific surface area of from 0.5 $m^2/g$ to 6 $m^2/g$; optionally, the silicon-oxygen compound has a specific surface area of from 1 $m^2/g$ to 3 $m^2/g$.

Embodiment 9. The silicon-oxygen compound according to any one of embodiments 1 to 8, wherein the silicon-oxygen compound has a compaction density of from 1.2 $g/cm^3$ to 1.7 $g/cm^3$ measured under a pressure of 5 tons (equivalent to 49 KN); optionally, the silicon-oxygen compound has a compaction density of from 1.2 $g/cm^3$ to 1.5 $g/cm^3$ measured under a pressure of 5 tons (equivalent to 49 KN).

Embodiment 10. The silicon-oxygen compound according to any one of embodiments 1 to 9, wherein the silicon-oxygen compound has a coating layer on an outer surface, and the coating layer comprises one or more of a polymer, a carbon material, a metal material, and a metal compound.

Embodiment 11. A method for preparing a silicon-oxygen compound, comprising the following steps:
  providing raw materials comprising a copper source, optionally a manganese source, and at least one of silicon monoxide powder and a mixture of elemental silicon powder and silicon dioxide powder; and heating the raw materials in an inert atmosphere under normal pressure or reduced pressure to generate a gas; and
  cooling the gas in the inert atmosphere under normal pressure or reduced pressure to deposit and thus obtain the silicon-oxygen compound from the gas;
  wherein the silicon-oxygen compound has a formula $SiO_x$, in which $0<x<2$, the silicon-oxygen compound contains both manganese element and copper element, a content of the manganese element is from 20 ppm to 500 ppm, and a mass ratio of the manganese element to the copper element is from 1 to 18.

Embodiment 12. The method according to embodiment 11, wherein the deposition temperature is 850° C. or less; optionally, the deposition temperature is from 300° C. to 750° C.

Embodiment 13. The method according to embodiment 11 or 12, wherein after the gas is deposited, the method further comprises a step of crushing the obtained deposit.

Embodiment 14. The method according to embodiment 13, wherein after the obtained deposit is crushed, the method further comprises a step of surface coating of particles.

Embodiment 15. A secondary battery, comprising the silicon-oxygen compound according to any one of embodiments 1 to 10 or the silicon-oxygen compound obtained by the method according to any one of embodiments 11 to 14.

Embodiment 16. A battery module, comprising the secondary battery according to embodiment 15.

Embodiment 17. A battery pack, comprising the battery module according to embodiment 16.

Embodiment 18. An apparatus, comprising at least one of the secondary battery according to embodiment 15, the battery module according to embodiment 16, or the battery pack according to embodiment 17.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Example 1

Preparation of a Silicon-Oxygen Compound 1) 43.33 g of metallic silicon 1 (content of silicon element was ≥99.7%, content of manganese element was 100 ppm, content of aluminum was ≤1000 ppm, content of iron element was ≤1000 ppm, and content of calcium element was ≤100 ppm), 6.67 g of metallic silicon 2 (content of silicon element was ≥98.5%, content of manganese element was 1000 ppm, content of aluminum element was ≤5000 ppm, content of iron element was ≤5000 ppm, and content of calcium element was ≤3000 ppm), 50 g of silicon dioxide powder, and 0.012 g of metallic copper powder were mixed to obtain a mixture of raw materials, wherein the content of the manganese element in the mixture was 110 ppm, and the content of the copper element in the mixture was 120 ppm. Among the raw materials, the manganese element was derived from the metallic silicon 1 and the metallic silicon 2, not from a manganese source; the copper element was derived from metallic copper as a copper source.

2) In a nitrogen atmosphere with an absolute pressure of 30 Pa, the raw materials were heated at a temperature of 1300° C. to generate $SiO_x$ gas, which contained 20 ppm of manganese element and 20 ppm of copper element.

3) In the nitrogen atmosphere with the absolute pressure of 30 Pa, the gas was cooled at a temperature of 850° C. to get a deposit from the gas, and the deposit was crushed to obtain the silicon-oxygen compound.

Preparation of an Electrode Plate

The silicon-oxygen compound prepared above, a conductive agent Super-P (conductive carbon black), a conductive agent CNT (carbon nanotubes), and a binder PAA (polyacrylic acid) were mixed thoroughly at a mass ratio of 85:4.5:0.5:10 in an appropriate amount of deionized water to form a uniform negative electrode slurry; the negative electrode slurry was coated on the surface of a copper foil as a negative electrode current collector, and the negative electrode plate was obtained after drying and cold pressing.

Counter Electrode

A metallic lithium sheet was used.

Separator

A polyethylene (PE) film was used.

Preparation of an Electrolytic Solution

Ethylene carbonate (EC), ethyl methyl carbonate (EMC), and diethyl carbonate (DEC) were mixed at a volume ratio of 1:1:1, then $LiPF_6$ was uniformly dissolved in the mixture of the solvent to obtain an electrolytic solution, and then fluoroethylene carbonate (FEC) was added, wherein the $LiPF_6$ had a concentration of 1 mol/L, and the mass percentage FEC in the electrolytic solution was 6%.

Preparation of a Button Battery

The above-mentioned electrode plate, separator, and metallic lithium sheet were stacked in order, and the above-mentioned electrolytic solution was added, thus obtaining a button battery.

Examples 2-21 and Comparative Examples 1-4

Different from Example 1, relevant parameters in the preparation method of the silicon-oxygen compound were adjusted to obtain corresponding silicon-oxygen compounds. See Table 1 for details.

Capacity Performance and Cycle Performance Test of Button Battery

At 25° C. and under the normal pressure, the button battery was discharged to 0.005 V at a constant current rate of 0.1 C, then discharged to 0.005 V at a constant current rate of 0.04 C and stood for 5 min, and the discharge capacity at this time, i.e., first-cycle lithium intercalation capacity, was recorded; then the button battery was charged to 1.5 V at the constant current rate of 0.1 C and stood for 5 min. This was a cyclic charge and discharge process. The charge capacity at this time, i.e., first-cycle lithium deintercalation capacity, was recorded. The button battery was subjected to 30 cycles of charge and discharge test according to the above method, and the lithium deintercalation capacity for each cycle was recorded.

Initial coulombic efficiency of the button battery (%)=first-cycle lithium deintercalation capacity/first-cycle lithium intercalation capacity×100%

Cycle capacity retention rate of the button battery (%)=30$^{th}$-cycle lithium deintercalation capacity/first-cycle lithium intercalation capacity×100%

The test results of Examples 1 to 21 and Comparative Examples 1 to 4 were shown in Table 2.

TABLE 1

| | Raw material configuration | | | | | | | | |
|---|---|---|---|---|---|---|---|---|---|
| | | | | Manganese source | | Copper source | | Raw materials after mixing | |
| No. | Metallic silicon 1 (g) | Metallic silicon 2 (g) | Silicon dioxide (g) | Manganese dioxide (g) | Metallic manganese (g) | Copper oxide (g) | Metallic copper (g) | Mn content (ppm) | Cu content (ppm) |
| Example 1 | 43.33 | 6.67 | 50.00 | / | / | / | 0.012 | 110 | 120 |
| Example 2 | 31.11 | 18.89 | 50.00 | / | / | / | 0.012 | 220 | 120 |
| Example 3 | 12.77 | 37.23 | 50.00 | / | / | / | 0.011 | 385 | 110 |
| Example 4 | / | 50.00 | 50.00 | / | 0.060 | / | 0.030 | 1099 | 300 |
| Example 5 | / | 50.00 | 50.00 | / | 0.115 | / | 0.045 | 1647 | 449 |
| Example 6 | / | 50.00 | 50.00 | / | 0.171 | / | 0.060 | 2205 | 599 |
| Example 7 | / | 50.00 | 50.00 | / | 0.005 | / | 0.010 | 550 | 100 |
| Example 8 | / | 50.00 | 50.00 | / | 0.033 | / | 0.011 | 830 | 110 |
| Example 9 | / | 50.00 | 50.00 | / | 0.060 | / | 0.012 | 1099 | 120 |
| Example 10 | / | 50.00 | 50.00 | / | 0.088 | / | 0.013 | 1379 | 130 |
| Example 11 | / | 50.00 | 50.00 | / | 0.115 | / | 0.013 | 1648 | 130 |
| Example 12 | / | 50.00 | 50.00 | / | 0.170 | / | 0.015 | 2196 | 150 |
| Example 13 | / | 50.00 | 50.00 | / | 0.226 | / | 0.017 | 2753 | 170 |
| Example 14 | 12.77 | 37.23 | 50.00 | / | / | / | 0.011 | 385 | 110 |
| Example 15 | 12.77 | 37.23 | 50.00 | / | / | / | 0.011 | 385 | 110 |
| Example 16 | 12.77 | 37.23 | 50.00 | / | / | / | 0.011 | 385 | 110 |
| Example 17 | 12.77 | 37.23 | 50.00 | / | / | / | 0.011 | 385 | 110 |
| Example 18 | 12.77 | 37.23 | 50.00 | / | / | / | 0.011 | 385 | 110 |
| Example 19 | 12.77 | 37.23 | 50.00 | / | / | / | 0.011 | 385 | 110 |
| Example 20 | 12.77 | 37.23 | 50.00 | / | / | 0.013 | / | 385 | 104 |
| Example 21 | / | 50.00 | 50.00 | 0.095 | / | / | 0.030 | 1099 | 300 |
| Comparative Example 1 | / | 50.00 | 50.00 | / | 0.281 | / | 0.060 | 3299 | 598 |
| Comparative Example 2 | 45.17 | 4.83 | 50.00 | / | / | / | 0.010 | 93 | 100 |
| Comparative Example 3 | 40.27 | 9.73 | 50.00 | / | / | / | 0.030 | 138 | 300 |
| Comparative Example 4 | / | 50.00 | 50.00 | / | 0.170 | / | 0.012 | 2196 | 120 |

In Table 1, "/" indicated that such material was not added.

TABLE 2

| | Silicon-oxygen compound | | | | Initial | Cycle capacity |
|---|---|---|---|---|---|---|
| No. | Mn content (PPm) | Cu content (PPm) | Mn/Cu | $D_v50$ (μm) | coulombic efficiency (%) | retention rate (%) |
| Example 1 | 20 | 20 | 1.0 | 6 | 70.2 | 87.8 |
| Example 2 | 40 | 20 | 2.0 | 6 | 69.8 | 89.3 |
| Example 3 | 70 | 18 | 3.9 | 6 | 76.1 | 96.7 |
| Example 4 | 200 | 49 | 4.1 | 6 | 75.7 | 96.6 |
| Example 5 | 295 | 75 | 3.9 | 6 | 74.9 | 96.5 |
| Example 6 | 400 | 100 | 4.0 | 6 | 74.7 | 96.3 |
| Example 7 | 97 | 15 | 6.5 | 6 | 76.0 | 95.4 |
| Example 8 | 150 | 19 | 7.9 | 6 | 75.9 | 95.3 |
| Example 9 | 200 | 20 | 10.0 | 6 | 75.9 | 96.1 |
| Example 10 | 255 | 21 | 12.1 | 6 | 75.4 | 96.4 |
| Example 11 | 309 | 21 | 14.7 | 6 | 74.9 | 94.4 |
| Example 12 | 400 | 25 | 16.0 | 6 | 74.3 | 94.8 |
| Example 13 | 500 | 28 | 17.9 | 6 | 71.5 | 89.8 |
| Example 14 | 70 | 18 | 3.9 | 4 | 73.3 | 90.2 |

TABLE 2-continued

| No. | Silicon-oxygen compound | | | | Initial coulombic efficiency (%) | Cycle capacity retention rate (%) |
| --- | --- | --- | --- | --- | --- | --- |
| | Mn content (PPm) | Cu content (PPm) | Mn/Cu | $D_v50$ (μm) | | |
| Example 15 | 70 | 18 | 3.9 | 5 | 75.7 | 93.5 |
| Example 16 | 70 | 18 | 3.9 | 8 | 75.6 | 93.0 |
| Example 17 | 70 | 18 | 3.9 | 10 | 73.7 | 92.3 |
| Example 18 | 70 | 18 | 3.9 | 12 | 71.2 | 91.8 |
| Example 19 | 70 | 18 | 3.9 | 15 | 71.2 | 90.0 |
| Example 20 | 70 | 18 | 3.9 | 6 | 76.2 | 95.9 |
| Example 21 | 200 | 49 | 4.1 | 6 | 75.6 | 96.2 |
| Comparative Example 1 | 600 | 100 | 6.0 | 6 | 61.8 | 69.9 |
| Comparative Example 2 | 17 | 17 | 1.0 | 6 | 64.3 | 78.2 |
| Comparative Example 3 | 25 | 50 | 0.5 | 6 | 63.0 | 79.1 |
| Comparative Example 4 | 400 | 20 | 20.0 | 6 | 65.2 | 74.3 |

It can be seen from the data in Table 2 that Examples 1-21 all satisfied that the silicon-oxygen compound contained both manganese element and copper element, the content of manganese element was from 20 ppm to 500 ppm, and the mass ratio of the manganese element to the copper element was from 1 to 18; the initial coulombic efficiency of the battery and its capacity retention rate after cycles were significantly improved.

In Comparative Example 1, the too high manganese content reduced gram capacity of the material, and excessive manganese weakened the bonding of silicon and oxygen in the silicon monoxide material, causing silicon monoxide particles to be broken more easily during charging and discharging; in Comparative Example 2, the too low manganese content reduced the conductivity for active ions and electrons of the silicon monoxide particles, resulting in an increase in the impedance of the negative electrode and the polarization of the battery; thus, resulting in poor initial coulombic efficiency and cycle performance of the batteries.

The mass ratio of the manganese element to the copper element in Comparative Example 3 was too low, and the mass ratio of the manganese element to the copper element in Comparative Example 4 was too high, thus the manganese element and the copper element cannot achieve good synergistic effect, resulting in poor initial coulombic efficiency and cycle performance of the button batteries.

Described above are merely specific embodiments of the present application, but the protection scope of the present application is not limited thereto. Any modification, replacement, or other equivalent readily conceived by a skilled person in the art according to the disclosure of the present application shall fall within the protection scope of the present application. Therefore, the protection scope of the present application shall be subject to the protection scope of the claims.

What is claimed is:

1. A silicon-oxygen compound, the silicon-oxygen compound having a formula $SiO_x$, in which $0<x<2$, wherein the silicon-oxygen compound contains both manganese element and copper element, a content of the manganese element is from 20 ppm to 500 ppm, and a mass ratio of the manganese element to the copper element is from 1 to 18; wherein in X-ray diffraction analysis, the silicon-oxygen compound has a diffraction peak at a position where a diffraction angle 2θ is from 19° to 27°, and the diffraction peak has a full width at half maxima of from 4° to 12°.

2. The silicon-oxygen compound according to claim 1, wherein the content of the manganese element is from 70 ppm to 400 ppm.

3. The silicon-oxygen compound according to claim 1, wherein a content of the copper element is from 10 ppm to 100 ppm.

4. The silicon-oxygen compound according to claim 1, wherein the mass ratio of the manganese element to the copper element is from 3.9 to 16.

5. The silicon-oxygen compound according to claim 4, wherein the mass ratio of the manganese element to the copper element is from 3.9 to 12.1.

6. The silicon-oxygen compound according to claim 1, wherein in X-ray diffraction analysis, the silicon-oxygen compound has a diffraction peak at a position where a diffraction angle 2θ is from 19° to 27°, and the diffraction peak has a full width at half maxima of from 5° to 10°.

7. The silicon-oxygen compound according to claim 1, wherein in Raman spectrum analysis, the silicon-oxygen compound has scattering peaks at positions where Raman shifts are from 1300 $cm^{-1}$ to 1400 $cm^{-1}$ and from 1550 $cm^{-1}$ to 1650 $cm^{-1}$, respectively.

8. The silicon-oxygen compound according to claim 2, wherein in Raman spectrum analysis, the silicon-oxygen compound has scattering peaks at positions where Raman shifts are from 1300 $cm^{-1}$ to 1400 $cm^{-1}$ and from 1550 $cm^{-1}$ to 1650 $cm^{-1}$, respectively.

9. The silicon-oxygen compound according to claim 1, wherein the silicon-oxygen compound has an average particle size $D_v50$ of from 4 μm to 15 μm.

10. The silicon-oxygen compound according to claim 9, wherein the silicon-oxygen compound has an average particle size $D_v50$ of from 5 μm to 10 μm.

11. The silicon-oxygen compound according to claim 1, wherein the silicon-oxygen compound has a specific surface area of from 0.5 $m^2/g$ to 6 $m^2/g$.

12. The silicon-oxygen compound according to claim 1, wherein the silicon-oxygen compound has a compaction density of from 1.2 $g/cm^3$ to 1.7 $g/cm^3$ measured under a pressure of 5 tons (equivalent to 49 KN).

13. The silicon-oxygen compound according to claim 1, wherein the silicon-oxygen compound has a coating layer on an outer surface, and the coating layer comprises one or more of a polymer, a carbon material, a metal material, and a metal compound.

14. A method for preparing a silicon-oxygen compound, comprising the following steps:
- providing raw materials comprising a copper source, a manganese source, and at least one of silicon monoxide powder and a mixture of elemental silicon powder and silicon dioxide powder; and heating the raw materials in an inert atmosphere under normal pressure or reduced pressure to generate a gas; and
- cooling the gas in the inert atmosphere under normal pressure or reduced pressure to deposit and thus obtain the silicon-oxygen compound from the gas;
- wherein the silicon-oxygen compound has a formula $SiO_x$, in which $0<x<2$, the silicon-oxygen compound contains both manganese element and copper element, a content of the manganese element is from 20 ppm to 500 ppm, and a mass ratio of the manganese element to the copper element is from 1 to 18; wherein in X-ray diffraction analysis, the silicon-oxygen compound has a diffraction peak at a position where a diffraction angle $2\theta$ is from 19° to 27°, and the diffraction peak has a full width at half maxima of from 4° to 12°.

15. The method according to claim 14, wherein the deposition temperature is 850° C. or less.

16. The method according to claim 14, wherein after the gas is deposited, the method further comprises a step of crushing the obtained deposit.

17. The method according to claim 16, wherein after the obtained deposit is crushed, the method further comprises a step of surface coating of particles.

18. A secondary battery, comprising the silicon-oxygen compound according to claim 1.

* * * * *